United States Patent [19]
Stein

[11] Patent Number: 5,314,327
[45] Date of Patent: May 24, 1994

[54] MOLD CLAMP FOR AN INJECTION MOLDING MACHINE

[75] Inventor: Walter Stein, Schwerin, Fed. Rep. of Germany

[73] Assignee: Hemscheidt Maschinentechnik Schwerin GmbH, Fed. Rep. of Germany

[21] Appl. No.: 990,387

[22] Filed: Dec. 14, 1992

[30] Foreign Application Priority Data

Dec. 14, 1991 [DE] Fed. Rep. of Germany ....... 4141259

[51] Int. Cl.⁵ ............................................. B29C 45/64
[52] U.S. Cl. .............................. 425/589; 100/258 A; 425/450.1; 425/451.2; 425/451.9; 425/590
[58] Field of Search ............... 100/46, 258 A, 258 R, 100/918; 425/168, 406, 408, 409, 450.1, 451, 451.2, 451.9, 589, 590

[56] References Cited

U.S. PATENT DOCUMENTS

| | | | |
|---|---|---|---|
| 2,309,944 | 2/1943 | Flowers | 100/46 |
| 2,484,908 | 10/1949 | Purcell | 100/46 |
| 2,636,433 | 4/1953 | Wennberg | 100/46 |
| 3,588,957 | 6/1971 | Schwartz | 425/590 |
| 4,158,910 | 6/1979 | Hanas et al. | 425/590 |
| 4,732,032 | 3/1988 | Kogure | 100/46 |
| 5,110,283 | 5/1992 | Bluml et al. | 425/589 |
| 5,249,951 | 10/1993 | Leonhartsberger et al. | 100/258 A |

FOREIGN PATENT DOCUMENTS 0311133 4/1989 European Pat. Off. .

Primary Examiner—Charles S. Bushey
Attorney, Agent, or Firm—EGLI International

[57] ABSTRACT

A mold clamp for an injection molding machine with a stationary mold clamping plate and a movable mold clamping plate displaceable on a sliding carriage, which mold clamping plates are arranged on a machine frame and support mold-halves of a mold for processing plastic material, on the sliding carriage side guide rollers are provided which are adjustable with eccentric bolts and are supported on the machine frame, an air clearance is provided between the movable mold clamping plate and the sliding carriage, which are connected with each other for relative movement therebetween by connecting elements and a vertical trunnion transversely displaceable to the machine longitudinal axis, and are secured together with fastening screws.

6 Claims, 12 Drawing Sheets

MOLD CLAMP FOR AN INJECTION MOLDING MACHINE

BACKGROUND OF THE INVENTION

The invention relates to a mold clamp for an injection molding machine. The mold clamp includes stationary and movable mold clamping plates arranged on the injection molding machine frame. The movable clamping plate is supported on a sliding carriage provided with two sliding blocks and a deflection resistant connecting member. Both mold clamping plates hold the half-molds of the mold and are connectable or connected with each other by cantilever columns or columns that extend therethrough. A mold height adjusting device is provided for adjusting the mold height. For displacing the half-molds of the mold toward and away from each other, there are provided one or more quick-action cylinder units for displacing the movable mold clamping plate to an open or closed position, and a closing cylinder unit for applying a locking or opening force during respective displacement of the movable mold clamping plate.

In injection molding machines which are known in the art, the movable mold clamping plate and the sliding carriage are form-lockingly connected in the vicinity of the machine longitudinal axis near the plate front or rear edge, and are secured to each other, likewise in the vicinity of the longitudinal machine axis, with fastening screws. Such a connection provides only for small displacement of the mold clamping plate relative to the sliding carriage at outer edges to the right and to the left of the mold clamping plate. That is the case when the movable mold clamping plate, viewed from above, deflects relative to the sliding carriage under the action of the closing force of the closing cylinder unit against frictional resistance.

Alignment of the movable mold clamping plate with respect to the stationary mold clamping plate by height and gradient is effected by insertion of shims, the thickness of which is determined experimentally. Sidewise alignment of the movable clamping plate is effected with pressure screws which act sidewise on the sliding carriage. At the four corners of the sliding carriage, combined roller-slide guides are adjusted, with separate pressure screws, on corresponding guide surfaces of the machine frame. The drawback of this lateral guide system is that it is very expensive and imprecise, and the adjusting process is complex and likewise expensive. When the closing cylinder unit applies a closing force to the two half-molds of the mold, the mold clamping plates are subjected to deformations that could have different effects. Dependent on the mold configuration, asymmetrical opening forces occur during mold opening which, with fixed connection between the mold clamping plate and the sliding carriage, results in increased shearing forces acting on the sliding carriage. Thereby, the guides for the sliding carriage in the machine frame are subjected to a high load, which, on one hand, results in wear and harmful play and, on the other hand, in excessive stress of the centering elements of the half-molds.

The tolerances, with which the mold clamping plates, the mold and the guides are encumbered during their manufacturing, are added to the mold joint line and to the guides. With existing unparallelism between the half-molds of the mold, the half-molds will be pulled together to their completely closed position with a substantially excessive force of the closing cylinder. This results in very large shearing forces acting on the guides of the sliding carriage, and they become to some extent deformed and become inclined with respect to the machine frame. Because of this, the lateral guides of the sliding carriage can become so loaded that, on one hand, wear and harmful play occur between the sliding carriage and the machine frame and, on the other hand, the centering elements of the half-mold are again heavily loaded and subjected to wear. Thereby, at a subsequent closing of the mold, the two half-molds are not precisely positioned against each other, due to the unacceptably large play of the sliding carriage, which leads to further damage of the mold. As a result, the quality of the produced molding becomes inferior and leads to so-called floating skin of the molding. With existing unparallelism, the sliding carriage can be further lifted with its front or rear edge on the machine frame until the half-molds are positioned parallel to each other. This leads to a transverse displacement of one half-mold relative to the other with resulting damaging consequences. In the tilted position of the sliding carriage, the mold opens again, and the half-molds are displaced, in this position of the sliding carriage, toward each other to an unprecise position, because of the sliding carriage play, in the injection cycle. This results in tearing of the guide elements of the mold and premature wear. Further, because of the acting shearing forces, additional frictional resistance should be overcome, which should be taken into account when designing the drive.

German Patent 3,718,106 describes a solution to the foregoing problems, according to which the sliding carriage is supported in the machine frame against the action of the vertical load by linear rolling bearing guides. To insure guide parallelism, the sliding carriage is displaced with two synchronously driven threaded spindles.

However, this solution is very expensive and does not solve the problems connected with plan-parallel displacement of both half-molds of the mold.

EP 0 311 133 discloses a different type of mold clamp for small closing forces, which does not include columns. With this mold clamp, all in the vertical direction occurring force differences and position deviations are compensated in the movable mold clamping plate. To this end, the movable mold clamping plate is supported on a rotational horizontal axle and is connected with a hydraulic closing cylinder unit, which centrally engages it, with the axle link. The link has adjustable stops, and the movable mold clamping plate is supported in the machine frame on a roller, whereby angular movement of the link about the rotational axis becomes possible. Below the link, a pull-back spring, acting on the link, is arranged. Besides the shortcoming of this solution being suitable only for small closing forces, the movable mold clamping plate can compensate position deviations between the stationary plate and the movable plate only in the vertical direction. Force differences and position deviations in the horizontal plane, between left and right sides of the apparatus, cannot be compensated.

SUMMARY OF THE INVENTION

Accordingly, it is an object of the present invention to increase the functional reliability and the precision in guiding the sliding carriage or the movable mold clamping plate, and to reduce the technical complexity and frictional resistance that has to be overcome. A further object of the invention is to increase the molding time and the functional precision of the mold and thereby the quality of produced molding pieces. Still, a further object of the invention is to provide, for the whole injection molding process, a precise and functionally reliable guiding of the sliding carriage, and to enable adjustment or resetting of the movable mold clamping plate in all coordinates, independent of the relation of the sliding carriage to the stationary mold clamping plate.

Pursuant to these objects and others which will become apparent hereafter, one aspect of the present invention resides in providing the sliding carriage with side guide rollers at its sides, which guide rollers are adjusted with eccentric bolts and are supported on the machine frame. This play-free adjustment of the sliding carriage with respect to the machine frame a permits a stable and functionally reliable position of the sliding carriage to be achieved in the machine frame, which, in addition, is rather cost effective. By this anti-friction guiding, the stick-slip effect on the sliding carriage is prevented, and tractive resistance is reduced.

An air clearance is provided between the sliding carriage and the movable mold clamping plate, and both are connected to each other with at least three, advantageously four, connection elements formed as flexing compression rods. Further, the movable mold clamping plate is connected with the sliding carriage by a vertical trunnion displaceable transverse to the injection molding axis. The two are fastened to each other by fastening screws which are arranged in the region of border areas of the longitudinal axis of the molding machine.

The combination of these features provides the movable mold clamping plate with all degrees of freedom necessary for its adaptation to the half-mold supported on the stationary mold-clamping plate, without causing transverse tension between the half-molds of the mold. Thereby, the greatest possible protection of expensive and complex molds in critical closing and opening phases is achieved, and a high quality of the molding pieces is assured. During the asymmetrical opening process, the flexing compression rods limit the oblique displacement of the movable half-mold so that no harmful transverse displacement between the half-molds and no excessive flexing of the centering elements can take place.

A further advantage is that, as it would be explained mathematically, the forces which act on the lateral guides of the sliding carriage, during a closing process, are limited to about 1/30 of the maximal closing force, which positively influences the duration of the lateral (or side) guides of the sliding carriage. Another advantage of the inventive solution is that, without any friction, i.e. without hysteresis at any mold opening step, resetting of the movable mold clamping plate to its previously adjusted optimal position takes place. This produces equally optimal conditions for the mold closing step which follows. This is achieved due to the available air clearance between the sliding carriage and the movable mold clamping plate and due to the flexibility of the flexing compression rods.

In another embodiment of the invention, the connecting elements comprise lower and upper clamping shanks, which are received in respective openings in the sliding carriage and the movable mold clamping plate. The connecting elements have a reduced cross-section between the two clamping shanks, and a key taper is provided on the lower end surface of the connecting elements. The key tapers cooperate with wedge-shaped adjusting elements, which adjusting elements of two respective connecting elements are connected by an adjusting spindle. The rotation of the adjusting spindle provides for adjustment of the movable mold clamping plate relative to the sliding carriage and the stationary mold clamping plate.

In small injection molding machines with three connecting elements formed as flexing compression rods, the height and lateral adjustment of the movable mold clamping plate can be effected in a simple manner by pressure screws located beneath the connecting elements.

With a somewhat reduced precision requirement, an adjustment arrangement for adjusting the connecting elements can be used that would not require the key taper on the lower end surface of the connecting element. A further advantage consists in that no additional machining of the slide carriage is necessary because of centering of the adjusting spindle over the outer limiting stops. To insure the mobility of the movable mold clamping plate with respect to the sliding carriage, the openings in the reduced region of the connecting elements are stepwise enlarged.

Another advantage is that, in a large injection molding machine, two respective side guide rollers are arranged on a swelling cross-bar which is supported with eccentric bolts arranged, respectively, at the corners of the sliding carriage.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
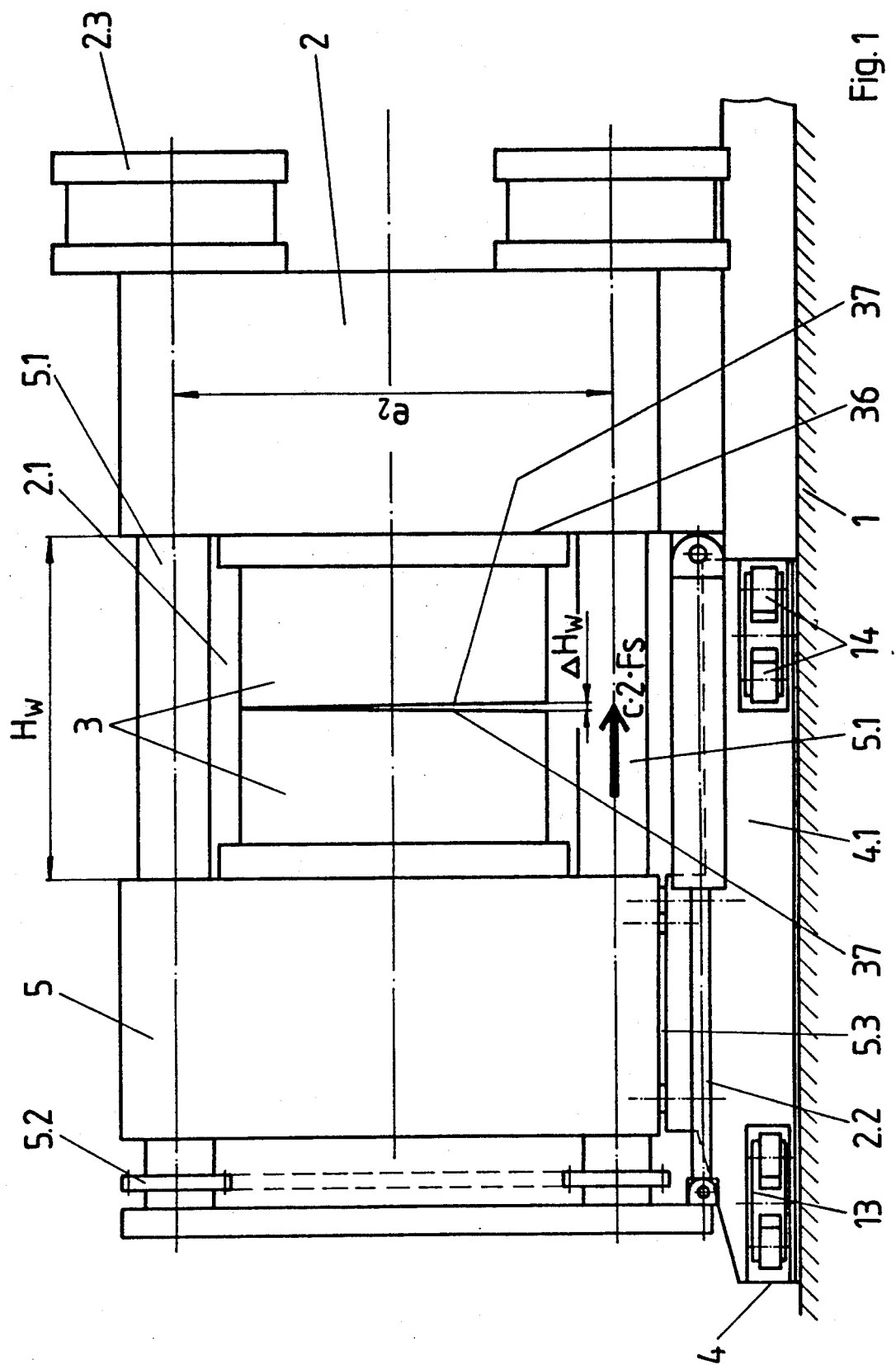
FIG. 1 is a side view of a mold clamp of an injection molding machine in a closing position, with vertical deviation from parallelism in the mold.

FIG. 1 shows a side view of a mold clamp for an injection molding machine in a closed position of the mold 3. The mold clamp consists of a stationary mold clamping plate 2 and a movable mold clamping plate 5 on which mold halves of the mold 3 are secured. The mold clamping plates 2 and 5 are connected or connectable with extending therethrough or cantilever columns 5.1 which are adjusted, for adjusting the molding height $H_w$, with a mold height adjusting device 5.2. A quick-action cylinder unit 2.2 provides for opening or closing of the mold area 2.1, and a locking cylinder unit 2.3 effects locking and opening of the mold 3.

Figure 2:
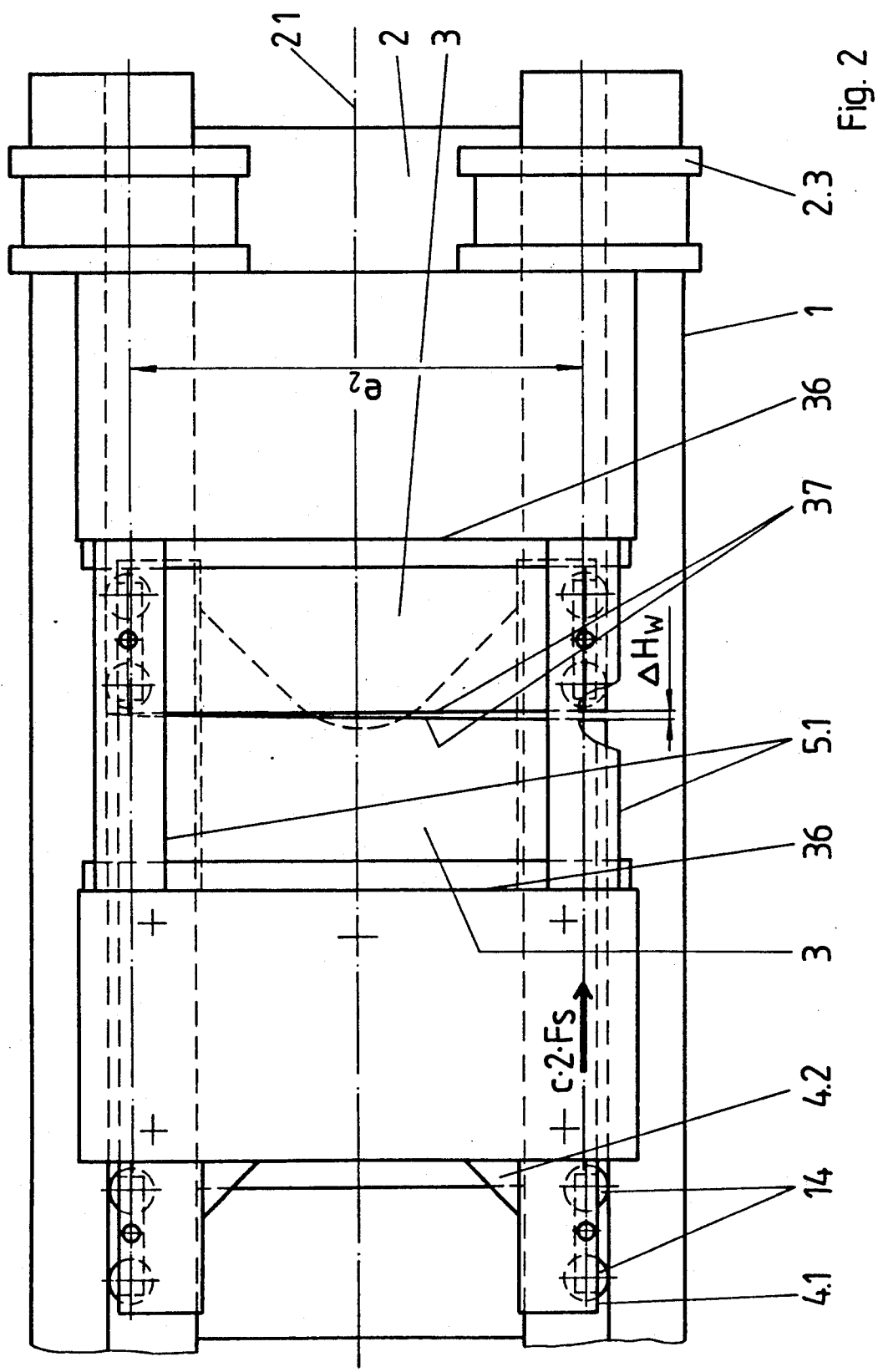
FIG. 2 is a plan view of a mold clamp of an injection molding machine in a closing position, with horizontal deviation from parallelism in the mold.
Figure 5:
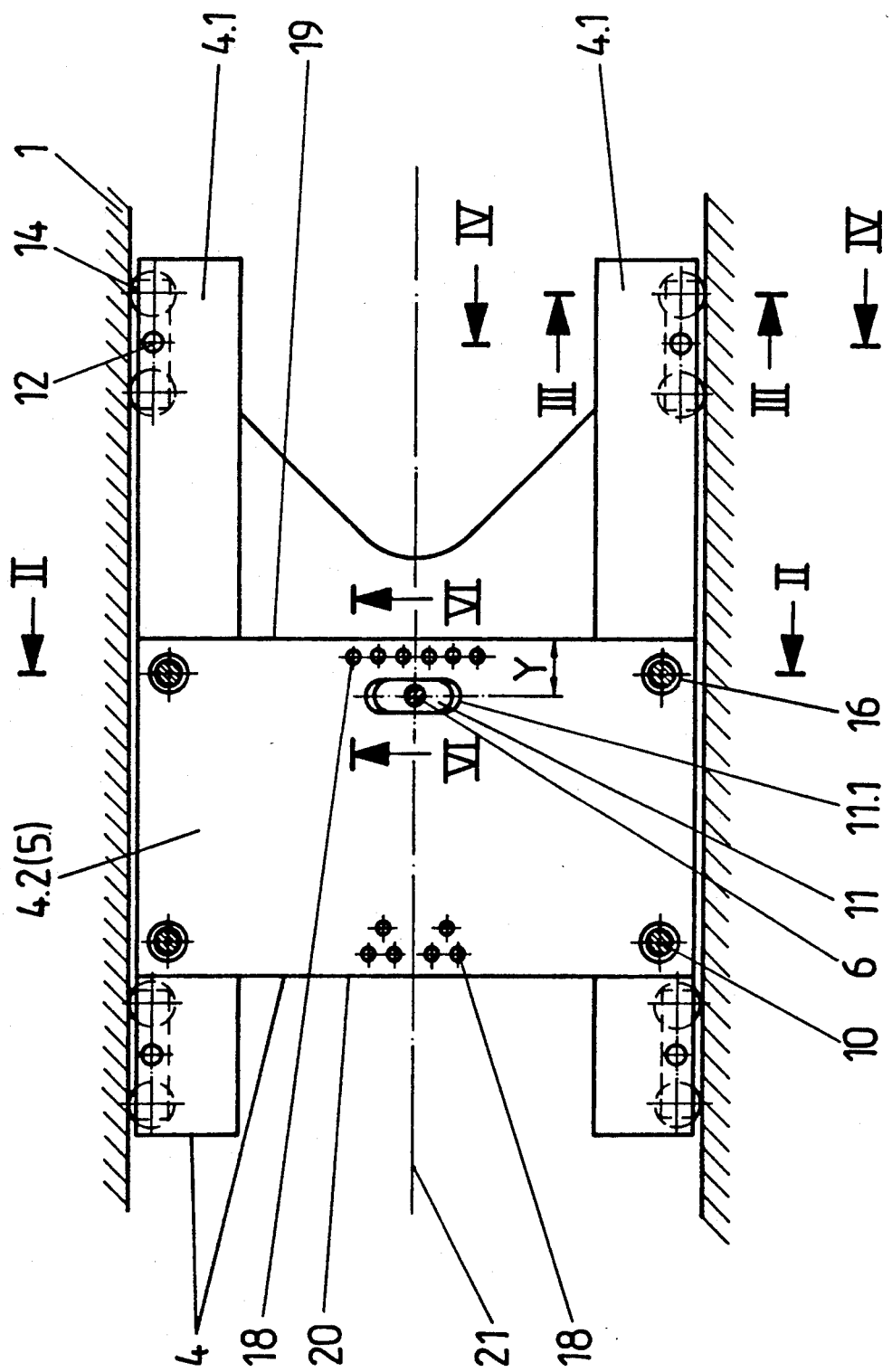
FIG. 5 is a horizontal cross-sectional view along line I—I in FIG. 4 through a plane of the air clearance between the sliding carriage and the movable clamping plate.
Figure 6:
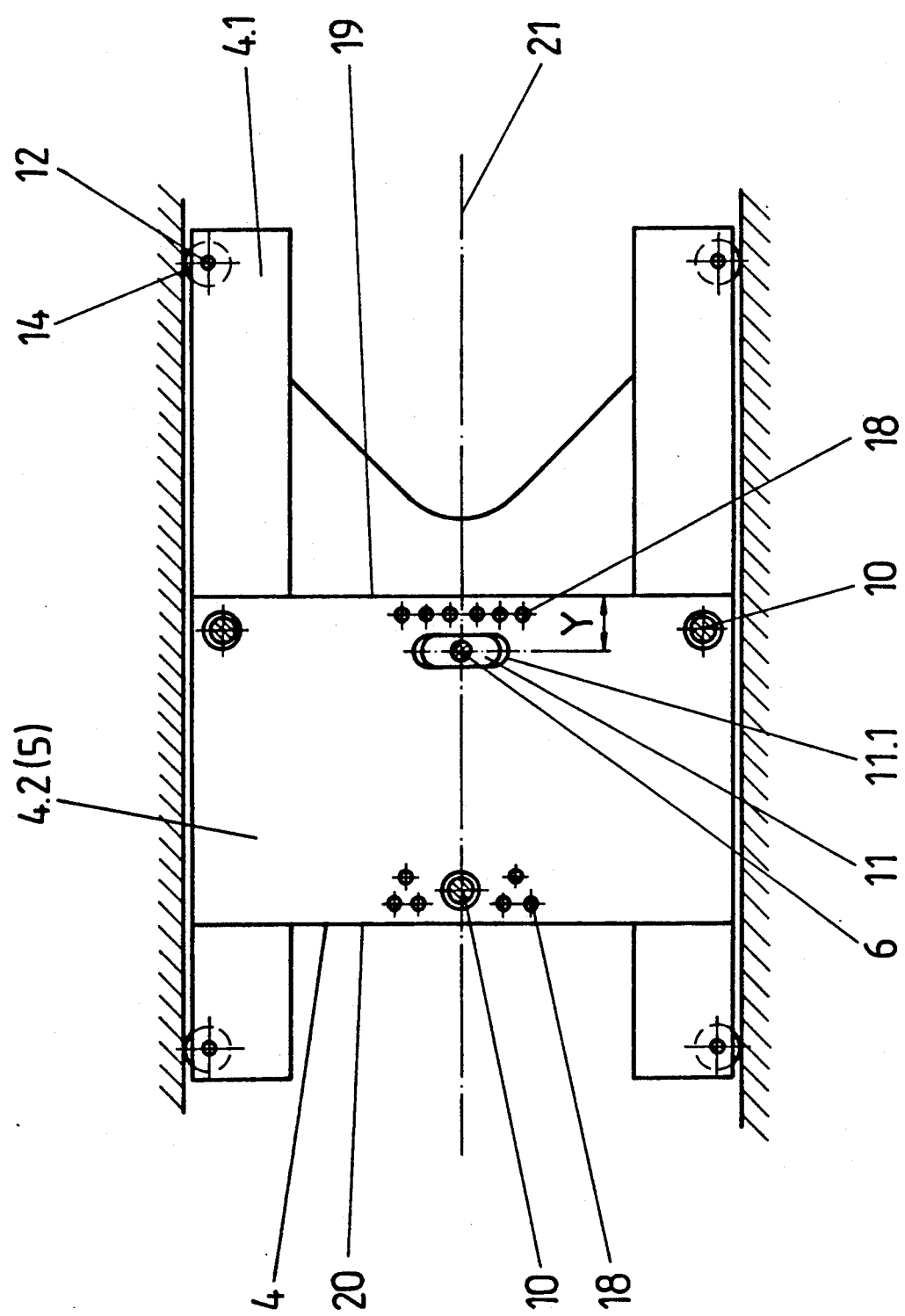
FIG. 6 is the same view as FIG. 5 of another embodiment.

The stationary mold clamping plate 2 and the movable mold clamping plate 5, arranged on a sliding carriage 4, are supported on a machine frame 1. The sliding carriage 4, are supported on a machine frame 1. The sliding carriage 4 comprises two sliding blocks 4.1 which are connected to each other by a deflection resistant connecting member 4.2, as shown in FIGS. 2, 5 and 6. At the sides of the sliding carriage 4, there are arranged outside, at the outer ends of each sliding block 4.1, dependent on the machine size, separate or arranged on a swinging cross-bar 13, twin side guide rollers 14, which will be described in more detail below.

FIG. 1 further shows that there is no parallelism between the two mold halves of the mold 3 in the vertical mold joint plane 37, and a deviation of $\Delta H_w$ from the mold height $H_w$ exists at the lower edge of the mold 3. The columns 5.1 are arranged at a distance $e_2$ from each other, and a force $c \cdot 2 \cdot F_s$, acts on the lower columns 5.1, as will be further explained with reference to FIG. 3.

FIG. 2 shows a similar mold clamp for an injection molding machine in a closing position of the mold 3. The view of FIG. 2, in contrast to that of FIG. 1, shows absence of parallelism between mold halves of the mold 3 in the horizontal joint plane 37. FIG. 2 shows a deviation from mold height $H_w$ at the vertical edges of the mold 3 as well as a force $c \cdot 2 \cdot F_s$ acting on the upper and lower columns 5.1.

Figure 3:
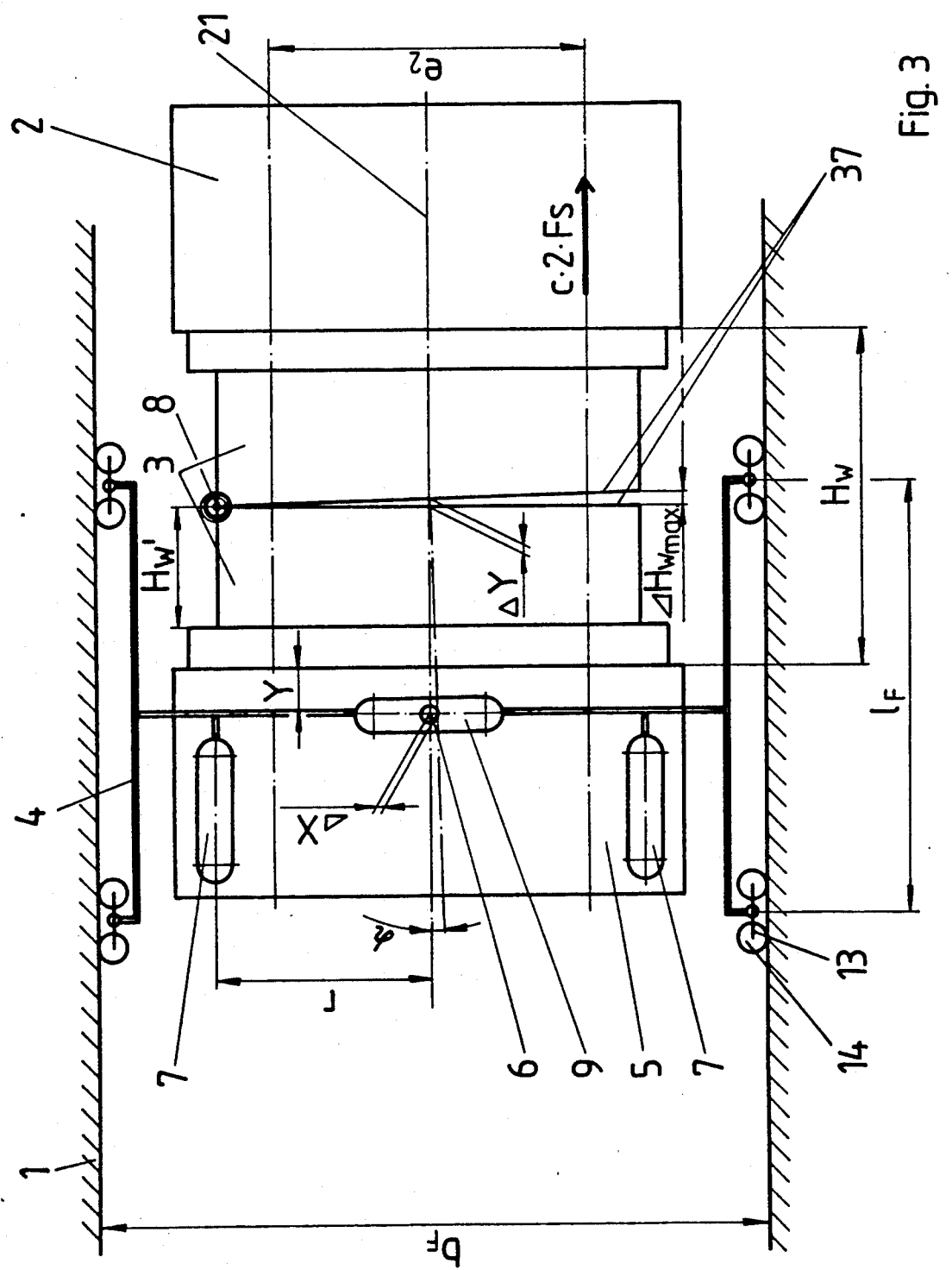
FIG. 3 shows schematically the basic principle for determining necessary degrees of freedom of a movable mold clamping plate.

FIG. 3 schematically shows a plan view of a mold clamp with deviation from parallelism in a horizontal joint plane 37 of the mold halves of the mold 3. If this deviation from parallelism $\Delta H_{wmax}$ should be compensated during closing, rotation of the movable mold clamping plate 5 relative to the sliding carriage 4 should be possible, because the position of the clamping plate 5 on the sliding carriage 4 should be maintained. This is achieved by rotating the movable mold clamping plate 5 about a constructive pivot point 6 under the action of proportional forces of the two closing cylinder units 2.3, in accordance with the action of forces $c \cdot 2 \cdot F_s$ on the lever arm of the distance $e_e$ between columns. During this rotation movement of the movable mold clamping plate 5, the sliding carriage 4 is supported, by its side guide rollers 14, on the lever arm, corresponding to guide length $L_F$, against the machine frame 1 on its guide width $b_f$.

Because the movable mold clamping plate should, at the mold opening step, automatically return to its previously adjusted position, rotation should be effected against resistance of two longitudinally arranged springs 7 on the lever arm r of the longitudinal axis of the machine 21. With each rotation of the movable mold clamping plate 5 about a rotation angle $\alpha$, transverse displacements $\Delta X$ in the joint plane 37 of the mold 3 occur. The displacement $\Delta X$ depends on the position y of the constructive pivot point 6 relative to the movable mold clamping surface, and the height $H_w1$ of a mold half of the mold 3. To prevent these transverse displacements, the rotation of the movable mold clamping plate 5 should take place about a theoretical pivot point 8. For this, it is necessary that the constructive pivot point 6 contain a spring-biased transverse degree of freedom, which, e.g. can be realized by means of a transverse spring 9. During diminishing of the clearance $\Delta H_{wmax}$, the sliding carriage 4 travels a distance $\Delta Y$, as it approaches to the stationary clamping plate 2. The spring force of springs 7 and 9 in FIG. 3 is expressed by the proportionality coefficient c in the expression $c \cdot 2 \cdot F_s$.

Figure 4:
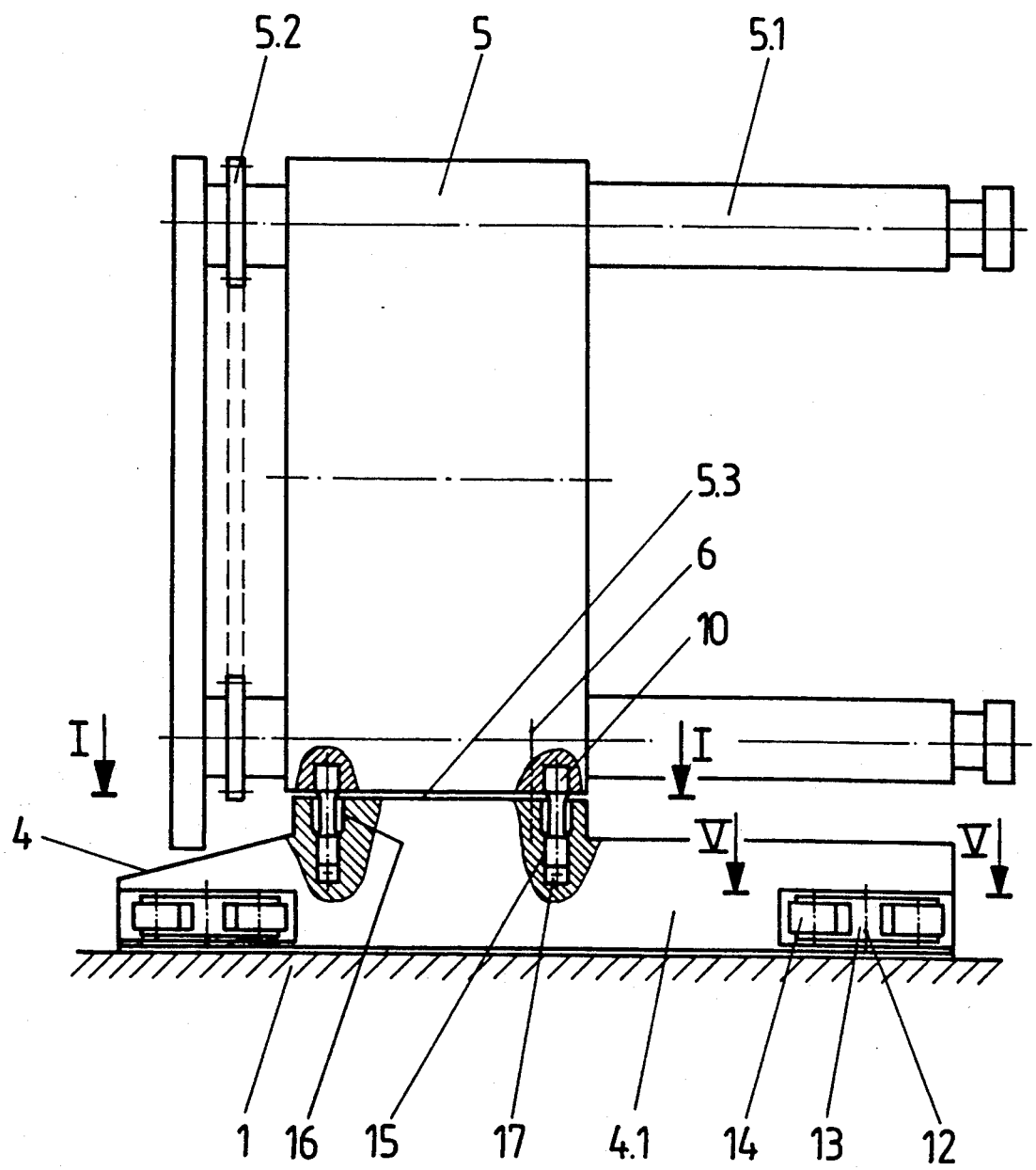
FIG. 4 is a side view of the movable mold clamping plate with the sliding carriage.

FIGS. 4, 5 and 6 show how the previously shown kinematic basic principle of relation between the sliding carriage 4 and the movable mold clamping plate 5 can be implemented so that the returning of the movable mold clamping plate 5 to its initial position takes place without any hysteresis. To this end, it is necessary that the movement of the movable clamping plate 5 relative to the sliding carriage 4 is effected without overcoming the frictional forces. This is achieved when the movable mold clamping plate 5 is supported on three or four connecting elements 10, which are formed as flexing compression rods and are arranged outside the clamping plate with a large spacing therebetween. An air clearance 5.3 should be provided between the sliding carriage 4 and the movable mold clamping plate 5. The constructive pivot point 6 is realized as a crank 11 transversely displaceable in a groove 11.1. All resettings of the movable mold clamping plate 5 to its initial position in the x- and y-directions is effected by means of connecting elements 10, which are formed as the flexing compression rods and which are in a position in which their deformation energy is stored.

The constructive pivot point 6 determines the exact geometric location of the movable mold clamping plate 5 relative to the sliding carriage 4 along the longitudinal axis 21 of the machine in a manner that counteracts to the forward inclination of the movable mold clamping plate 5 under the weight of a heavy mold 3 (not shown) supported thereon.

Figure 8:
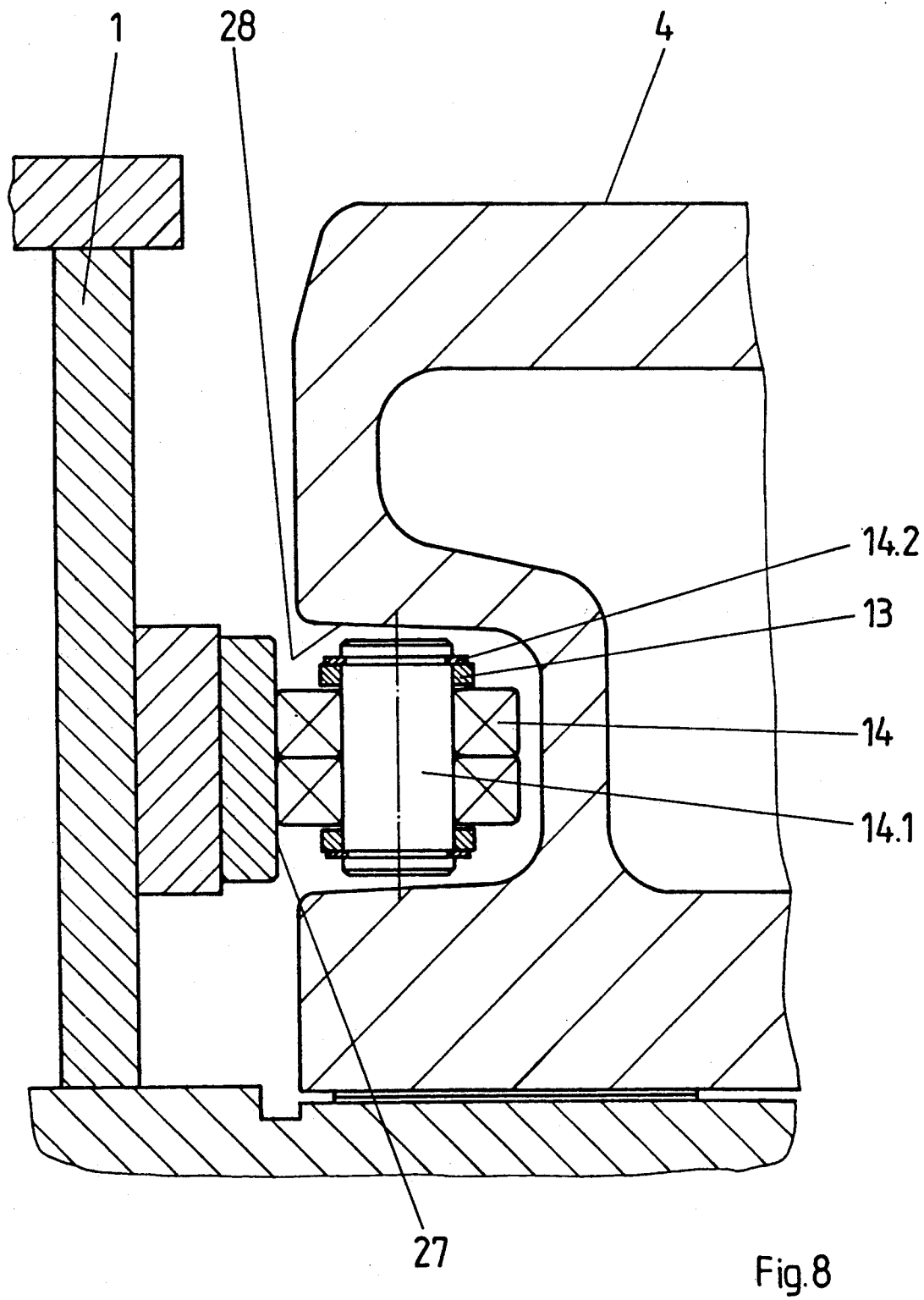
FIG. 8 is a vertical cross-sectional view along line III—III in FIG. 5 through the sliding block with the side guide of the sliding carriage.
Figure 9:
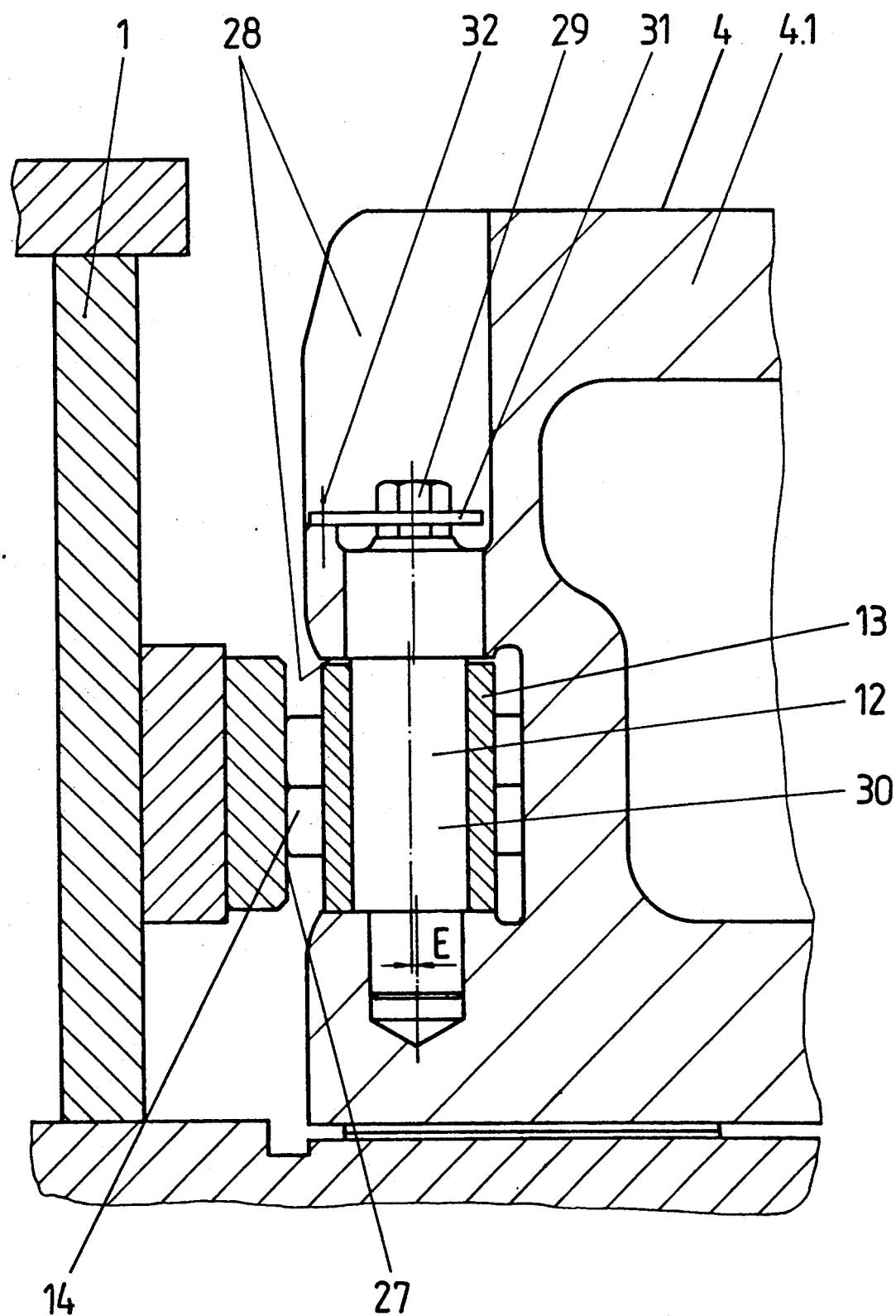
FIG. 9 is a vertical cross-sectional view along line IV—IV in FIG. 5 through the eccentric bolts for adjusting the slide guide of the sliding carriage.
Figure 10:
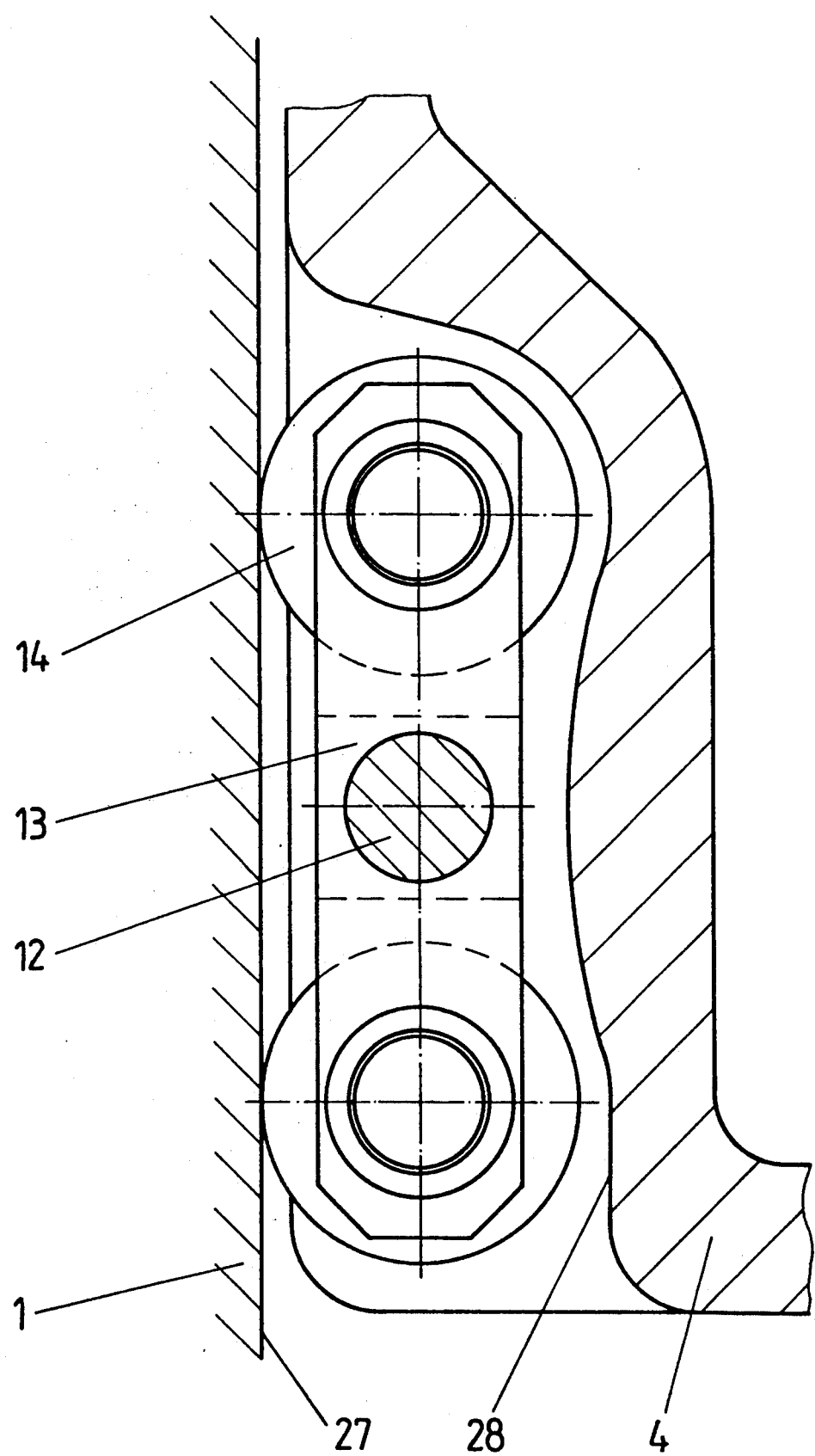
FIG. 10 is a horizontal cross-sectional view along line V—V in FIG. 4 through the slide guide for the sliding carriage.

FIG. 4 shows a side view of the movable mold clamping plate 5 with the sliding carriage 4. In the movable mold clamping plate 5, there are arranged cantilever columns 5.1, which are adjusted to a respective mold height $H_w$ by means of the mold height adjusting device 5.2. The sliding blocks 4.1 of the sliding carriage 4 are arranged at the outer ends of the swinging cross-bar 13, and are adjusted with eccentric bolts 12. Two side guide rollers 14 are respectively located in the swinging cross-bar 13. The whole assembly is shown in FIGS. 8, 9 and 10, and it will be explained further below, as needed.

Connecting elements 10 formed as flexing compression rods can be seen in a partial cross-sectional view between the movable mold clamping plate 5 and the sliding carriage 4. The movable mold clamping plate 5 is so supported by the connecting elements 10, that an air clearance 5.3 can be seen between the movable mold clamping plate 5 and the sliding carriage 4. A more detailed description of connecting elements 10 and their arrangement will be made when FIG. 7 is described.

As shown in FIG. 5, the sliding carriage 4 consists of sliding blocks 4.1 and a connecting member 4.2, as can be seen along the plane of the air clearance 5.3 in the cross-sectional view I—I of FIG. 4. This figure shows in particular a pictorial representation of the position and arrangement of the connecting elements between the movable mold clamping plate 5 and the sliding carriage 4. The four connecting elements 10 for the movable mold clamping plate 5, not shown in the sectional view, are located far outside, in the vicinity of corner points of the movable mold clamping plate 5. The following description will be made with reference to the movable mold clamping plate 5. The base surface of the connecting element 4.2 of the sliding carriage 4 converges with the base surface of the movable mold clamping plate 5. Fastening screws 18 are provided in the vicinity of the front edge 20 and the rear edge 20 of the movable mold clamping plate 5 on opposite sides of the machine longitudinal axis 21. Furthermore, the pivot point 6 can be seen and is formed as a transversely displaceable crank 11 at an as small as possible distance from the front edge 19 of the movable mold clamping plate 5. The crank 11 is displaceable in the groove 11.1. The shown arrangement also has eccentric bolts 12 secured to the slide blocks 4.1 of the sliding carriage 4, and side guide rollers 14 displaceable in the swinging cross-bar 13 and engaging the machine frame 1.

FIG. 6 shows, in contrast to FIG. 5, that the movable mold clamping plate 5, which again is not recognizable, is supported on the sliding carriage 4 by only three connecting elements 10. With this arrangement, two supporting elements 10 are located in the vicinity of the front edge 19 and one supporting element 10 is located at the rear edge of the movable mold clamping plate 5. Such an arrangement is important because, on the one hand, the supporting forces at the front edge of the movable mold clamping plate 5 and the mold half of the mold, are much greater than at the rear edge. On the other hand, the rear connecting element 10 should be more flexible than the front connecting element 10. FIG. 6 further shows that the side guide rollers 14 are arranged not in a swinging cross-bar but directly on the eccentric bolts 12. The embodiment with three supporting elements shown in FIG. 6 with the arrangement of the side guide rollers 14 directly on the eccentric bolts 12 is suitable for small mold clamps of injection molding machines, in which small closing and opening forces act.

Figure 7:
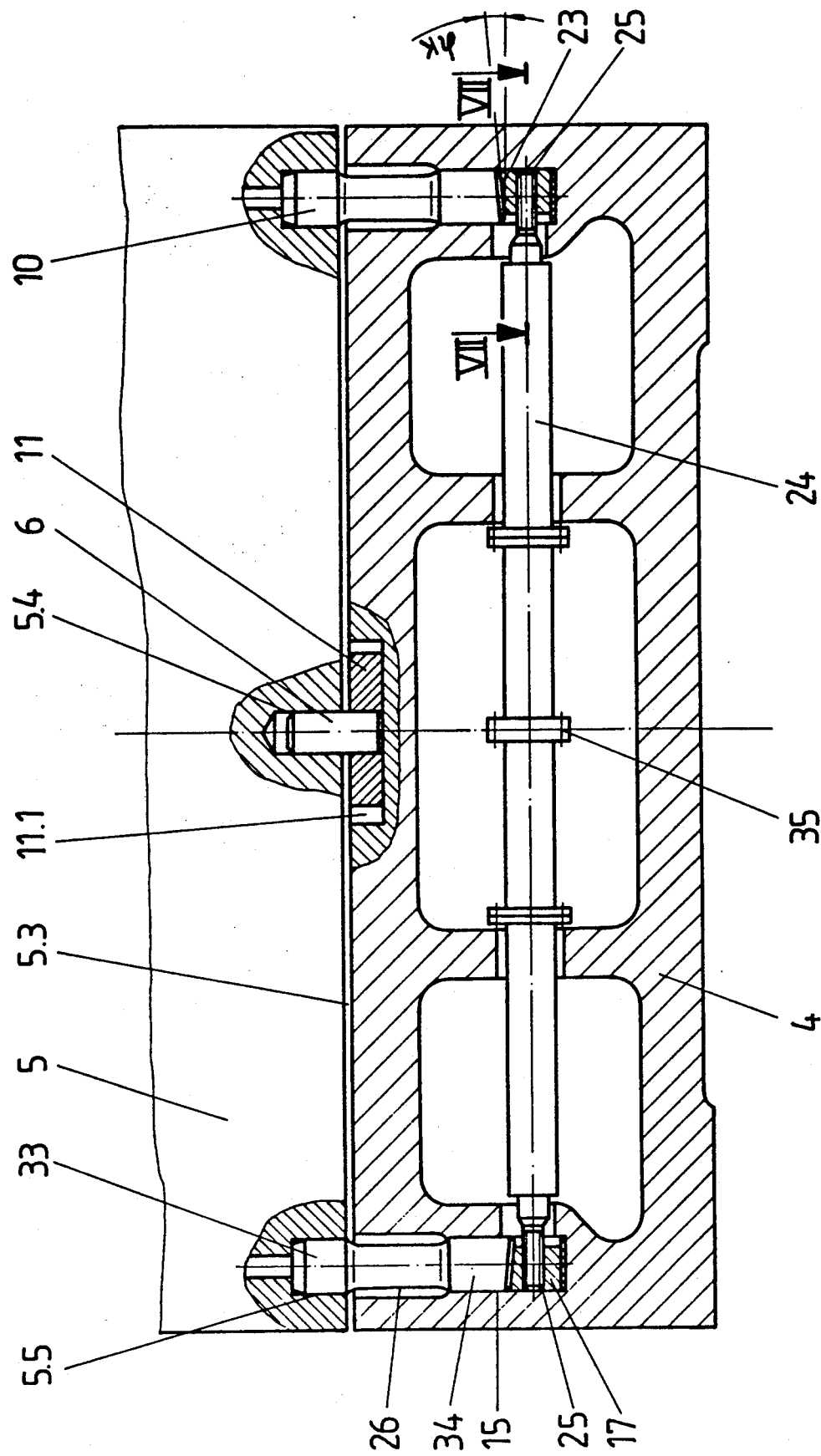
FIG. 7 is a vertical cross-sectional view along line II—II in FIG. 5 through the adjusting device for connecting elements.

FIG. 7 shows a cross-sectional view through the entire sliding carriage 4 with a portion of the movable mold clamping plate 5 supported thereon. In FIG. 7, two of three or four connecting elements 10 can be seen, which support the movable mold clamping plate 5 which is adjustable by a height adjusting device. The supporting elements 10, on their lower end surface 23, are tapered with a self-locking angle. Each tapered end surface 23 is operatively connected with a wedge-shaped adjusting element 17. An adjusting spindle 24 simultaneously moves two adjusting elements 17 toward or away from each other. In this way, the supporting elements 10, together with the movable mold clamping plate 5, move up or down. The adjusting spindle 24 is centered in a location hole 15 by means of outer stops 25. Advantageously, the adjusting spindle 24 is divided into three sections which are detachably connected with each other. This permits avoidance of additional mechanical machining of the sliding carriage 4 and enables easy mounting of the adjusting spindle 24 which is movable with a piece 35. Furthermore, FIG. 7 shows that the hole 15 has a larger diameter 16 in the region of the flexing part 26. The air clearance 5.3 between the movable mold clamping plate 5 and the sliding carriage 4 is determined by the length of the connecting element 10 and the depth of the holes in two parts. In a broken-out cross-sectional view in the middle of FIG. 7, the pivot point 6 is shown as the crank 11 transversely displaceable in the groove 11.1, and received in hole 5.4 of the movable mold clamping plate 5.

FIG. 8 shows how the side guide rollers 14 of the sliding carriage 4 cooperate with a corresponding guide surface 27 on the machine frame 1 in accordance with sectional view III—III in FIG. 5. The swinging cross-bar 13 with the side guide rollers 14 are accommodated in a cast profile 28 of the sliding carriage 4. The side guide rollers 14 of the sliding carriage 4 are advantageously formed as roller bearings supported by pins 14.1 arranged in the swinging cross-bar 13 and secured by securing elements 14.2.

FIG. 9 shows a cross-sectional view through the eccentric bolts 12 along line IV—IV in FIG. 5, across the cast profile 28 in the sliding block 4.1 of the sliding carriage 4. By pivoting the clamping end 29 of the eccentric bolt 12, the eccentricity E of a portion 30 of the bolt on which the swinging cross-bar 13 or the slide guide rollers 14 are arranged, the distance of the side guide rollers 14 from the longitudinal axis 21 of the injection molding machine (not shown in FIG. 9) is adjusted. Thereby, mounting of the side guide rollers 14 on the guide surface 27 of the machine frame 1 is easy to effect.

FIG. 10 shows a horizontal cross-sectional view along line V—V in FIG. 4. The side guide rollers 14 are directly on the guide surface 27 of the machine frame 1, and the swinging cross-bar provides for load distribution.

Figure 11:
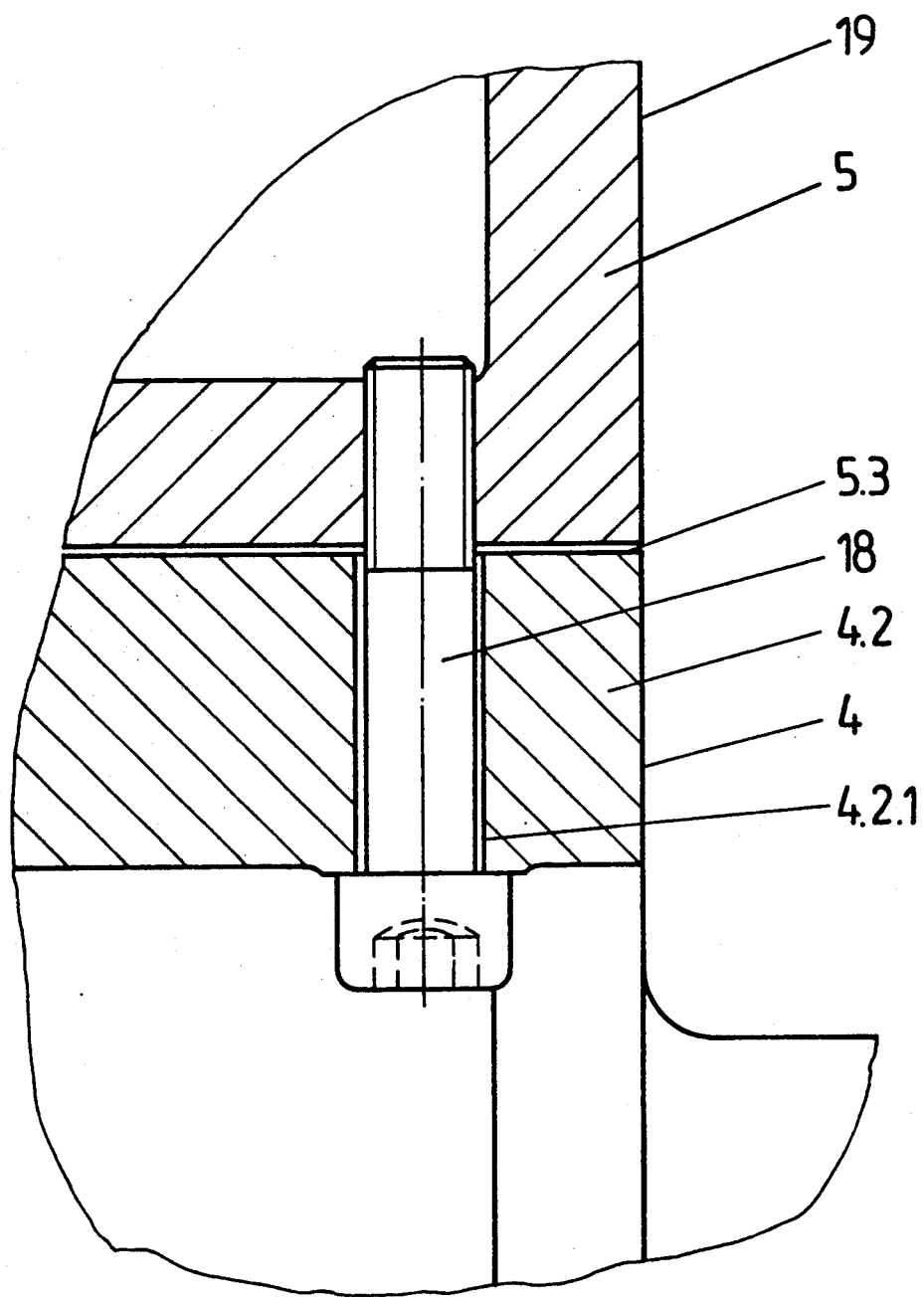
FIG. 11 is a vertical cross-sectional view along line VI—VI in FIG. 5 with arrangement of the fastening elements.

FIG. 11 shows a cross-sectional view along line VI—VI in FIG. 5, through the edge region between the movable mold clamping plate 5 and the connecting member 4.2 for the sliding blocks 4.1 of the sliding carriage 4. In this figure, one can clearly see the fastening screws 18 which connect the movable mold clamping plate 5 and the sliding carriage 4, as well as the air clearance 5.3. There is an adequate play between a fastening screw 18 and the location hole 4.2.1 in the connecting member 4.2 to compensate for position deviations of the movable mold clamping plate 5 relative to the sliding carriage 4. The fastening screws 18, in order to keep these deviations small, are arranged in the vicinity of the machine longitudinal axis 21 and the front and rear edges 19, 20 of the movable mold clamping plate 5, as can also be seen in FIGS. 5 and 6.

Figure 12:
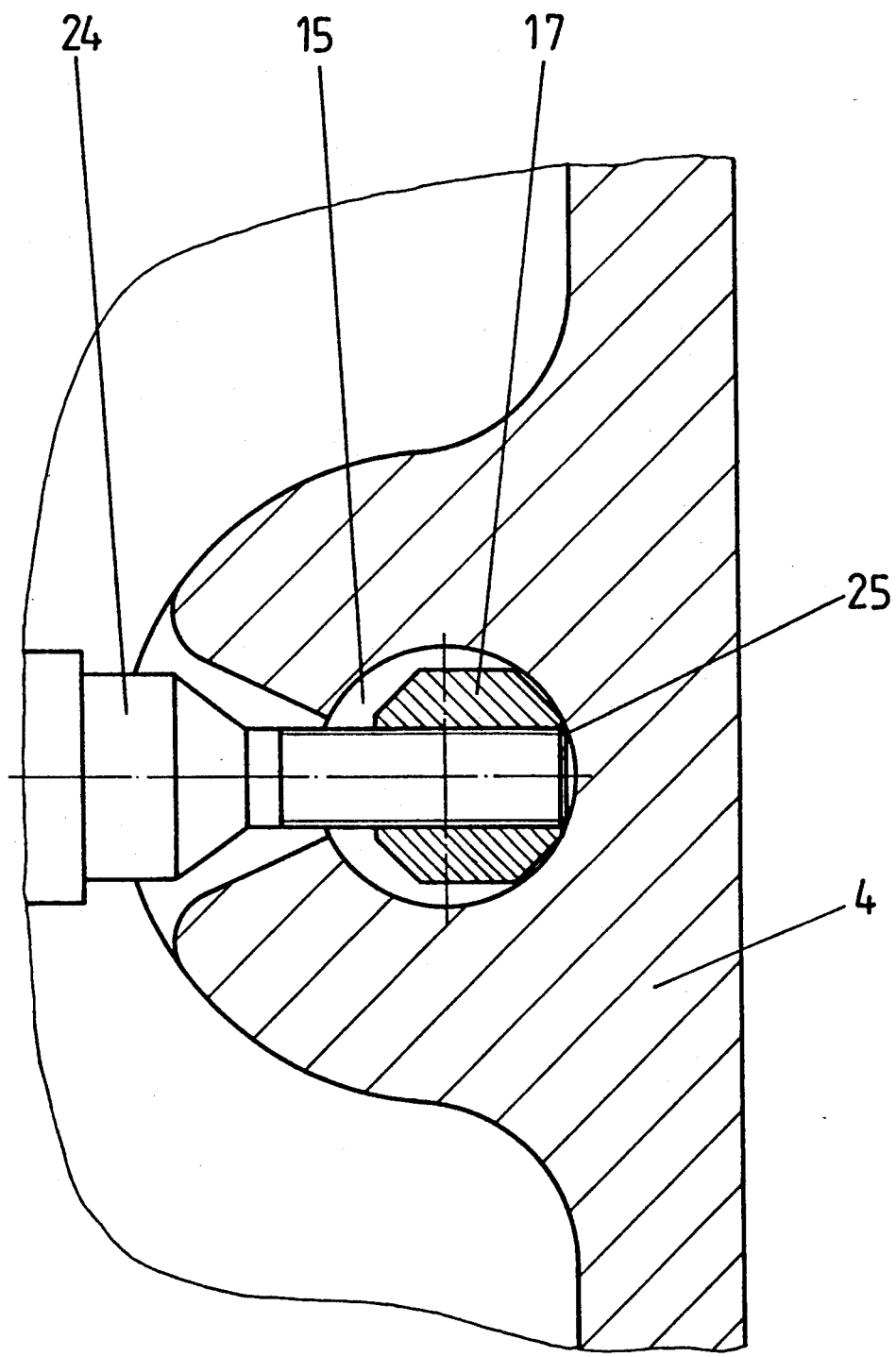
FIG. 12 shows a horizontal cross-sectional view along line VII—VII in FIG. 7.

In FIG. 12, it can be seen that the adjusting spindle 24 has its stop 25, with which it is centered, on the wall of the location hole 15. FIG. 12 also shows that the transverse adjusting travel of the wedge shaped adjusting elements 17 likewise takes place in the location hole 15.

Now the operation of the arrangement according to the invention will be described. During mounting of the mold clamp, the sliding carriage 4 with the movable mold clamping plate 5 is adjusted symmetrically relative to the machine axis 21, and the parallelism between the stationary and movable mold clamping plates is adjusted, both by means of an adjusting device that comprises a simulation mold. The adjusting is effected by means of the eccentric bolts 12 so that the sliding carriage 5 moves in the machine frame 1.

In this position, the eccentric bolts 12 are fixed by means of a locking plate 31 and a locking screw 32 (FIG. 9). Therefore, the height and parallelism of the movable mold clamping plate 5 relative to the stationary clamping plate 2 in the vertical direction is adjusted by a wrench gripping the constructional element 35 of the adjusting spindle 24 (FIG. 7). By rotating both adjusting spindles 24, the movable mold clamping plate 5 can be lifted and lowered depending on the direction of rotation of the adjusting spindle 24.

The adjustment of the movable clamping plate is effected by way of the connecting elements 10, which comprise lower clamping shanks 34 and upper clamping shanks 33, which are received in openings in the sliding carriage and the movable mold clamping plate. The connecting elements 10 have a reduced cross-section 26 between the two clamping shanks, and a key taper 23 provided on the lower end surface of the connecting elements which cooperate with wedge shaped adjusting elements 17. If only the front spindle 24 is rotated in the "lifting" direction, the movable mold clamping plate 5 inclines backward. If only the rear adjusting spindle 24 is rotated in the "lifting" direction, the movable mold clamping plate 5 inclines forward. Securing the adjusted movable mold clamping plate 5 is not necessary, as there exists a double automatic interlock, on one hand by means of a wedge angle $a_k$ on the connecting elements 10 and the adjusting elements 17 and, on the other hand, due to the threading of the adjusting spindle 24. After such an adjustment, the fastening screws 18 are firmly tightened, and the mold clamp is ready for the injection process.

In the process of manufacturing of the molds, the two mold halves are shaped on the basis of the clamping surface 36. Therefore, as a rule, the centering elements (not shown) extend, with great precision, at a right angle to the clamping surface 36 of the mold 3, while the joint planes 37 of the mold halves (FIGS. 1, 2 and 3) deviate to a larger and smaller degree from the clamping surface 36. This is the reason why, during the injection process, despite previous adjustment, deviations from parallelism between the mold halves of the form 3 exist and which have to be overcome by the positioning of the movable mold clamping plate 5.

During the closing process of the mold 3, the two mold halves contact each other only at a point 8, while in both the vertical and horizontal direction between the joint planes 37 a wedge clearance exists. Only by an excessive closing force is the mold half on the movable mold clamping plate 5 brought to a full abutment with the mold half on the stationary mold clamping plate 2 against the resistance of connecting elements 10 which are formed as flexing compression rods, and by displacing the constructive pivot point 8 at a distance $\Delta x$. The connecting elements 10 (flexing compression rods) are dimensioned so that they limit the force which acts on the side guide rollers 14 of the sliding carriage 4 to about 1/30 of the maximum closing force. This limited action of the connecting elements 10 is expressed as a proportional coefficient C (the spring force of the springs 7 and 9 in FIG. 3) for the proportional closing forces $c \cdot 2 \cdot F_s$.

The vertical resilience of the sliding carriage 4, in its front or rear region, in combination with the compression resilience of the connecting elements 10 (the flexing compression rods) is used to eliminate the clearance between the mold halves of the mold 3 in the vertical plane. Thereby, further transverse displacement between the mold halves of the mold 3 in the vertical direction is prevented. At the opening of the mold, the connecting elements 10, as a result of their stored energy of deformation, insure the return of the movable mold clamping plate 5 to it predetermined optimal position established when the mold was assembled. At the same time, rotation about constructive pivot point 6 and return movement of the trunnion, which is formed as a shank 11 displaceable in the groove 11.1 (FIGS. 3 and 7), along a distance $\Delta x$, take place. This insures that, during the subsequent closing steps, the mold half of the mold 3, which is supported on the movable mold clamping plate 5 will optimally engage the mold half. In the same manner, due to the vertical resilience of the connecting elements 10, the movable mold clamping plate 5 automatically returns to its optimal incline (position when the mold opens).

When critical opening takes place which, due to specifics of the mold 3, is realized asymmetrical, the mold 3 is pulled at an angle under the action of the opening forces. The stiffness of the connecting elements 10 is so selected that the oblique pull of the mold is limited before it reaches its compatibility limit. This means that, before all possible fit variations between the halves of the mold 3 come into play, the prevailing equilibrium of forces between the bending forces acting on the connecting element 10 and one-sided pulling-off forces is established.

Also, in contrast to this angled position of the movable mold clamping plate 5, automatic return of the movable mold clamping plate 5 to its optimal horizontal and vertical position takes place at the end of the mold opening movement. Again, this is achieved due to the vertical resilience of the sliding carriage 4 and bending an compression resilience of the connecting elements 10. In this way, the movable mold clamping plate 5 supported on the slide carriage 4, according to the invention, in comparison with prior art, has all necessary degrees of freedom, which insure an optimal closing process, which limit opening, which insure that the sliding carriage 4 remains in its predetermined position in the machine frame 1 at all deviations of the mold clamping plate 5 with regard to its lateral displacement, and which insure automatic return of the movable mold clamping plate to its initial position without hysteresis.

While the invention has been illustrated and described as embodied in a mold clamp for an injection molding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A mold clamp for an injection molding machine, comprising:
   a machine frame;
   a sliding carriage having two sliding blocks and a connecting member;

a stationary mold clamping plate;

a movable mold clamping plate arranged on said sliding carriage, the stationary and movable mold clamping plates being supported on the machine frame, each of the plates being formed so as to receive half of a mold;

straight columns provided so as to connect the plates to each other, the columns being adjustable in accordance with a mold height;

means for adjusting the columns to the mold height;

quick-action cylinder means for displacing the movable mold clamping plate between an open position in which the mold halves are separated and a closed position in which the mold halves are brought together;

closing cylinder means for providing closing and retaining forces as well as an opening force on the plates;

side guide rollers arranged on lateral sides of the sliding carriage, which side guide rollers are adjustable with eccentric bolts and are supported on the machine frame, an air clearance being provided between the movable mold clamping plate and the sliding carriage; and means for connecting the movable mold clamping plate and the sliding carriage together, said connecting means including at least three flexible compression rods, and, to permit relative displacement, a vertical trunnion displaceable transverse to a longitudinal axis of the machine, and fastening screws arranged in edge areas of the machine longitudinal axis for securing the sliding carriage and movable mold clamping plate together.

2. A mold clamp according to claim 1, wherein the connecting means have a lower end clamping shank and an upper end clamping shank which are received in location holes in the sliding carriage and in the movable clamping plate, the connecting means each having a reduced cross-section between the two clamping shanks and, on the lower end face, a key taper that extends at an angle and is operationally connected with a wedge-shaped adjusting element.

3. A mold clamp according to claim 2, wherein a rotatable spindle connects adjusting elements of two connecting means, the movable mold clamping plate being adjustable relative to the sliding carriage and the stationary mold clamping plate by rotation of the adjusting spindle.

4. A mold clamp according to claim 2, wherein the location holes are stepwise enlarged in the region of the reduced cross-section connecting means.

5. A mold clamp according to claim 1, wherein the connecting means includes three flexible compression rods.

6. A mold clamp according to claim 5, wherein each two side guide rollers are arranged in a swinging crossbar that is supported on one eccentric bolt and is located at a corner of the sliding carriage.

* * * * *